United States Patent [19]
Sewell et al.

[11] 3,764,016
[45] Oct. 9, 1973

[54] BELT FOR PICKING UP LIQUIDS
[75] Inventors: Richard B. H. Sewell; Simon P. Nelson, both of Victoria, British Columbia, Canada
[73] Assignee: R.B.H. Cybernetics (1970) Ltd., Victoria, British Columbia, Canada
[22] Filed: May 25, 1972
[21] Appl. No.: 257,014

[52] U.S. Cl............ 210/400, 210/502, 210/DIG. 21
[51] Int. Cl............................................. E02b 15/04
[58] Field of Search.................... 210/400, 401, 391, 210/488–491, 502, 505, 507, 500

[56] References Cited
UNITED STATES PATENTS
3,314,540 4/1967 Lane........................... 210/DIG. 21
3,617,552 11/1971 Will et al. ........................ 210/400

Primary Examiner—John Adee
Attorney—Peter Kirby et al.

[57] ABSTRACT

The belt comprises at least one layer of strong material (e.g., canvas) stitched to at least one layer of absorbent material (e.g., terry cloth). The stitching is arranged in a herringbone pattern of inclined rows extending from apices along the centre line, and the edges are free of further stitching. This arrangement facilitates squeezing of absorbed liquid laterally out of the belt between squeeze rollers.

6 Claims, 4 Drawing Figures

PATENTED OCT 9 1973　　　　　　　　　　3,764,016

BELT FOR PICKING UP LIQUIDS

This invention relates to a belt for use in picking up liquids.

There are many circumstances under which it happens that liquids, such as paint vehicles, palm oils, edible oils, organic chemicals, lubricatng oil, diesel oil, gasoline, kerosene, bunker fuel, emulsions and foams are found in various locations from which they are to be transferred to other locations. For various reasons, including safety, the avoidance of pollution and the reclaiming of valuable materials, it is often necessary or desirable to collect these liquids. Canadian Pat. No. 735,254 issued May 31, 1966 to R.B.H. Sewell discloses apparatus for removing liquid spill from the surface of another liquid, e.g., removing a layer of oil from a body of water. Such apparatus includes a roller system for guiding an endless belt continuously into contact with the spill to absorb the same and for then passing the belt through squeeze rollers to remove as much as possible of the spill liquid before returning the belt to the spill to absorb a further quantity thereof. The liquid squeezed out by the rollers is collected and appropriately disposed of.

The belt proposed for use in this prior apparatus was formed of a material that will absorb the spilled liquid in preference to the water, for example a loosely woven absorbent cotton.

The present invention is concerned with improvements in belts of this type, which belts may be employed either with a roller system such as that disclosed in the above-noted patent, or in association with other systems by means of which they are brought into contact at a first location with a liquid to be absorbed and are then conveyed to a second location where the liquid is squeezed out, the belt then being re-used for further absorption purposes. It is not essential to the present invention that the belt possess the property of preferential absorption, e.g., preferring say oil to water although this will normally be desirable. Moreover, belts constructed in accordance with the present invention may also be designed for duties involving the picking up of a liquid from a solid surface instead of from a body of water.

The object of the present invention is to provide an improved elongate belt of the type described that will combine the features of high absorption capacity with mechanical strength and endurance, as well as efficiency in operation, especially an effective removal of the absorbed liquid from the belt at the squeezing station. It is towards this latter end that the belt is formed with a pattern of stitching joining the layers of the belt together that is especially conducive to the effective squeezing of liquid laterally outwardly of the belt between squeeze rollers.

The invention consists of such a belt comprising
a. at least one layer of strong material imparting physical strength to the belt,
b. at least one layer of liquid absorbent material,
c. and stitching joining said layers together,
d. said stitching extending in parallel rows inclined to the direction of extent of the belt to form a herringbone pattern extending outwardly from a series of apices located along the longitudinal centre line of the belt to the edges of the belt,
e. the edges of the belt being otherwise free of stitching joining said layers together.

Embodiments of the invention are illustrated by way of example in the accompanying drawings.

Figures 1, 2, 3, 4:
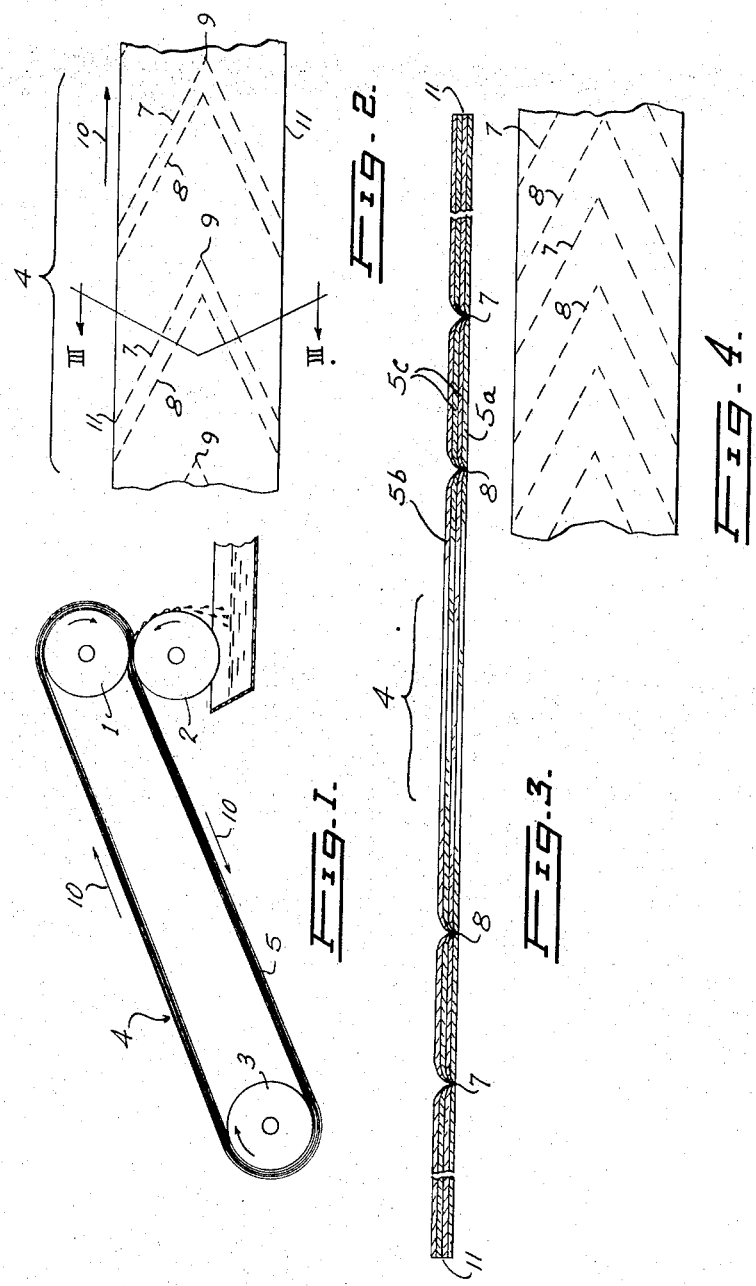
FIG. 1 is a side view of an endless pick-up belt constructed according to the invention and shown with a simple roller system.
FIG. 2 is a plan view of a portion of this belt.
FIG. 3 is a cross-section on III—III in FIG. 2.
FIG. 4 is an alternative to FIG. 2.

The roller system comprises squeeze and drive rollers 1 and 2, and a pick-up roller 3 located so as to bring the belt 4 extending around it into contact with the liquid (not shown). The belt 4 comprises a number of layers 5 of canvas and terry cloth. There must be at least one layer 5a of canvas or similar strong material to impart dimensional stability to the belt, and at least one layer 5b of terry cloth or other strongly absorbent material to provide the belt with the needed carrying capacity. While the belt may thus consist of only two layers, one of canvas and one of terry cloth, it will usually be preferred to add additional terry cloth layers 5c to increase the capacity of the belt. In some cases, additional canvas layers can also be used, e.g., when unusually high strength is required.

Stitching 7, 8 joins the layers 5 together along pairs of parallel lines that form a herringbone pattern on the belt. This arrangement of stitching is important in facilitating efficient unloading of the belt at the squeeze rollers 1,2. The apices 9 of the lines of stitching should be at or near the longitudinal centre line of the belt and, in use, must point in the direction that the belt will travel (arrows 10). It is also important that along the edges 11 there should be no stitching (other than where the stitching rows 7 and 8 reach the edges), thus permitting free travel of liquid out of the belt in the transverse direction of the belt. This freedom for liquid to move laterally from the belt edges is especially important during the unloading (squeezing) process; otherwise there would be a tendency for liquid to be trapped between the rollers or for the belt to be damaged.

It is preferable, but not essential, that the belt stitching be so arranged that the apex 9 of each stitiching row 7 is approximately in transverse alignment with the locations at which the stitching rows 8 join the edges 11.

While the stitching has been shown arranged in pairs of rows 7,8 with a gap to the next row, as an alternative the rows 7 and 8 can be spaced further from each other, so that the stitching is uniformly spaced along the belt, as shown in FIG. 4.

The belt ends, where they are joined to make an endless belt, are preferably cut in a V form so that they can be joined with a slight overlap by a row or rows of herringbone stitching conforming to the rows 7,8.

We claim:

1. An elongate belt for use in picking up liquids comprising
a. at least one layer of strong material imparting physical strength to the belt,
b. at least one layer of liquid absorbent material,
c. and stitching joining said layers together,
d. said stitching extending in parallel rows inclined to the direction of extent of the belt to form a herringbone pattern extending outwardly from a series of apices located along the longitudinal centre line of the belt to the edges of the belt, e. the edges of the belt being otherwise free of stitching joining said layers together.

2. A belt according to claim 1, wherein said rows of stitching are arranged in pairs with the spacing between adjacent pairs greater than between the individual rows of each pair.

3. A belt according to claim 2, wherein the apices formed by one said pair of stitching rows are substantially in transverse alignment with the locations at which the next adjacent pair of stitching rows join the belt edges.

4. A belt according to claim 1, wherein said layer of strong material is of canvas.

5. A belt according to claim 1, wherein said layer of absorbent material is a terry cloth.

6. A belt according to claim 1, including a plurality of layers of said liquid absorbent material.

* * * * *